US012062326B2

(12) United States Patent
Xie

(10) Patent No.: US 12,062,326 B2
(45) Date of Patent: Aug. 13, 2024

(54) PIXEL DRIVING CIRCUIT, DISPLAY PANEL, AND DISPLAY DEVICE WITH INITIALIZATION OF DRIVE TRANSISTOR AND DIODE

(71) Applicant: YUNGU (GU'AN) TECHNOLOGY CO., LTD., Hebei (CN)

(72) Inventor: Hongjun Xie, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 17/990,166

(22) Filed: Nov. 18, 2022

(65) Prior Publication Data

US 2023/0079903 A1 Mar. 16, 2023

Related U.S. Application Data

(63) Continuation of application No. PCT/CN2021/107572, filed on Jul. 21, 2021.

(30) Foreign Application Priority Data

Sep. 25, 2020 (CN) ......................... 202011025787.9

(51) Int. Cl.
*G09G 3/32* (2016.01)

(52) U.S. Cl.
CPC ....... *G09G 3/32* (2013.01); *G09G 2300/0819* (2013.01); *G09G 2300/0842* (2013.01);
(Continued)

(58) Field of Classification Search
CPC ............. G09G 3/32; G09G 2300/0819; G09G 2300/0842; G09G 2300/0861; G09G 2320/0233
See application file for complete search history.

(56) References Cited

U.S. PATENT DOCUMENTS

2006/0044236 A1 3/2006 Kim
2012/0147060 A1 6/2012 Jeong
(Continued)

FOREIGN PATENT DOCUMENTS

CN 105448234 A 3/2016
CN 106297645 A 1/2017
(Continued)

OTHER PUBLICATIONS

International Search Report issued on Sep. 16, 2021, in corresponding International Application No. PCT/CN2021/107572, 6 pages.
(Continued)

*Primary Examiner* — Liliana Cerullo
(74) *Attorney, Agent, or Firm* — Maier & Maier, PLLC

(57) ABSTRACT

A pixel driving circuit, a display panel and a display device. The pixel driving circuit includes a drive transistor, a storage module, a data writing module, a first initialization module, a second initialization module and a light-emitting element. The first initialization module is configured to initialize the gate of the drive transistor. The control terminal and the first terminal of the second initialization module are connected to a scan signal input terminal. The second initialization module is configured to initialize the light-emitting element. The data writing module is configured to write a data voltage into the gate of the drive transistor. The storage module is configured to store a gate voltage of the drive transistor. The drive transistor is configured to output a drive current according to the data voltage to drive the light-emitting element to emit light.

15 Claims, 8 Drawing Sheets

(52) U.S. Cl.
CPC ............... *G09G 2300/0861* (2013.01); *G09G 2320/0233* (2013.01)

(56) References Cited

U.S. PATENT DOCUMENTS

| | | | |
|---|---|---|---|
| 2016/0217743 A1 | 7/2016 | Kim et al. | |
| 2016/0267845 A1* | 9/2016 | Tsuge | G09G 3/3225 |
| 2017/0323598 A1 | 11/2017 | Park et al. | |
| 2018/0190196 A1* | 7/2018 | Kwon | H10K 59/30 |
| 2022/0415257 A1* | 12/2022 | Liu | G09G 3/3266 |

FOREIGN PATENT DOCUMENTS

| | | |
|---|---|---|
| CN | 106531075 A | 3/2017 |
| CN | 106558287 A | 4/2017 |
| CN | 106710529 A | 5/2017 |
| CN | 106782329 A | 5/2017 |
| CN | 107749247 A | 3/2018 |
| CN | 107993612 A | 5/2018 |
| CN | 110047432 A | 7/2019 |
| CN | 110289299 A | 9/2019 |
| CN | 111091781 A | 5/2020 |
| CN | 111341257 A | 6/2020 |
| CN | 111696473 A | 9/2020 |
| CN | 112102782 A | 12/2020 |

OTHER PUBLICATIONS

Office Action issued on Apr. 28, 2021, in related Chinese Patent Application No. 202011025787.9, 17 pages.

Office Action issued on Nov. 24, 2021, in related Chinese Patent Application No. 202011025787.9, 19 pages.

Office Action issued on Feb. 18, 2022, in related Chinese Patent Application No. 202011025787.9, 19 pages.

Notice of Rejection issued on May 20, 2022, in related Chinese Patent Application No. 202011025787.9, 15 pages.

* cited by examiner

PIXEL DRIVING CIRCUIT, DISPLAY PANEL, AND DISPLAY DEVICE WITH INITIALIZATION OF DRIVE TRANSISTOR AND DIODE

CROSS-REFERENCE TO RELATED APPLICATIONS

This application is a continuation of International Patent Application No. PCT/CN2021/107572, filed on Jul. 21, 2021, which claims priority to Chinese Patent Application No. 202011025787.9 filed on Sep. 25, 2020, disclosures of both of which are incorporated herein by reference in their entireties.

TECHNICAL FIELD

Embodiments of the present application relate to the field of display technologies and, in particular, to a pixel driving circuit, a display panel and a display device.

BACKGROUND

In the display process of a display panel, a pixel driving circuit drives a light-emitting diode to emit light to display. When the display panel has a relatively high refresh rate or a relatively high pixel density (measured in pixels per inch (PPI)), a pixel driving circuit at the far end has a different charging rate than a pixel driving circuit at the near end, resulting in different brightness in different positions of the display panel and poor display uniformity of the display panel.

SUMMARY

The present application provides a pixel driving circuit, a display panel and a display device to reduce the charging time of the pixel driving circuit and improve the display uniformity of the display panel.

Embodiments of the present application provide a pixel driving circuit. The pixel driving circuit includes a drive transistor; a first initialization module, where the first initialization module is connected to the drive transistor and configured to initialize a gate of the drive transistor; a light-emitting element; a scan signal input terminal; a second initialization module, where a control terminal of the second initialization module and a first terminal of the second initialization module are connected to the scan signal input terminal, a second terminal of the second initialization module is connected to the light-emitting element, and the second initialization module is configured to initialize the light-emitting element; a data writing module, where the data writing module is connected to the drive transistor and configured to write a data voltage into the gate of the drive transistor; and a storage module, where the storage module is connected to the drive transistor and configured to store a gate voltage of the drive transistor, where the drive transistor is connected to the light-emitting element and configured to output a drive current according to the data voltage to drive the light-emitting element to emit light.

Embodiments of the present application further provide a display panel including the pixel driving circuit according to any embodiment of the present application.

Embodiments of the present application further provide a display device including the display panel according to any embodiment of the present application.

In the technical solutions of the embodiments of the present application, a first terminal of the first initialization module is connected to an initialization signal input terminal, and the control terminal of the second initialization module and the first terminal of the second initialization module are connected to the scan signal input terminal. In this manner, when the gate of the drive transistor and an anode of the light-emitting element are initialized, the gate of the drive transistor can be initialized by use of an initialization signal which can be adaptively configured according to the duration of a data write stage of the pixel driving circuit so that insufficient data voltage writes caused by a too low potential of the gate of the drive transistor can be avoided at the end of initialization. Additionally, different drive currents caused by different charging rates of different pixel driving circuits can be avoided, and thereby the display uniformity of a display panel provided with the pixel driving circuit can be improved. Moreover, that the anode of the light-emitting element is initialized by use of a scan signal saves the trouble of providing another initialization signal input terminal, thereby saving the trouble of providing an additional initialization signal line, reducing the wiring difficulty of the display panel and being advantageous for the display panel to achieve a higher refresh rate or a higher PPI.

DETAILED DESCRIPTION

Figure 1:
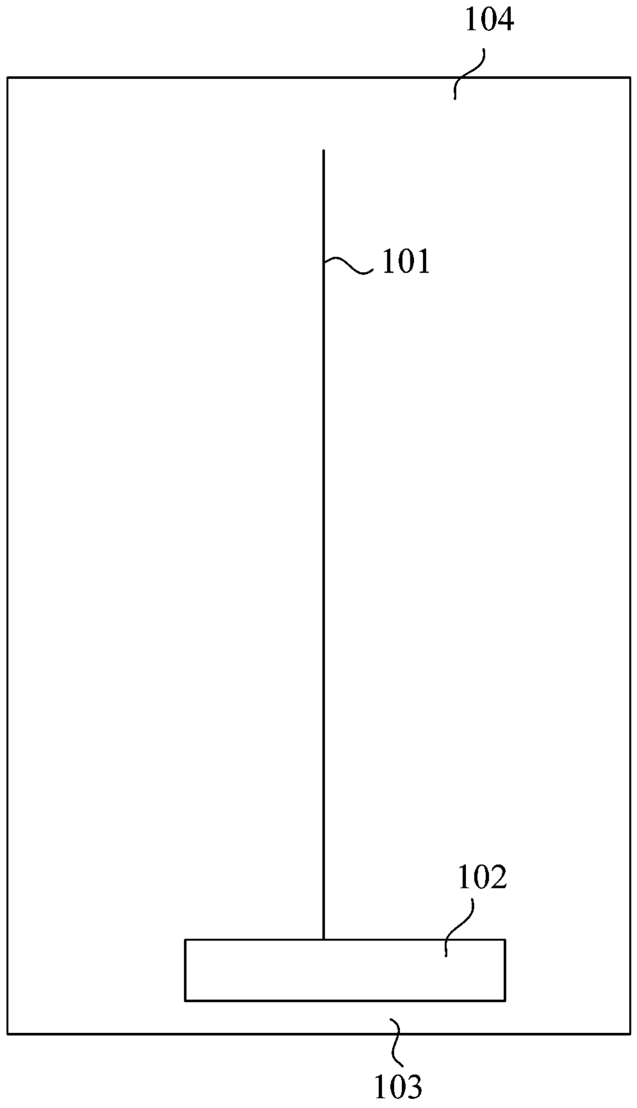
FIG. 1 is a diagram illustrating the structure of a display panel.

The present application is described below in conjunction with drawings and embodiments. The embodiments described herein are merely intended to explain and not to limit the present application. For ease of description, only part, not all, of structures related to the present application are illustrated in the drawings.

As shown in FIG. 1, a display panel includes a signal line 101 and a driver chip 102. The driver chip 102 is disposed at the first end 103 of the display panel. The signal line 101 extends to the second end 104 opposite to the first end 103 from the first end 103 of the display panel. The driver chip 102 supplies a data signal to a pixel driving circuit in the display panel through the signal line 101.

For example, the signal line 101 may be a data line and a power signal line. When the display panel has a higher refresh rate or higher PPI, the duration of one frame of a pixel driving circuit in the display panel is shorter so that the duration of the data write stage of the pixel driving circuit is shorter. The signal line 101 is connected to multiple pixel driving circuits in its extending direction. As the loads of the signal line 101, the multiple pixel driving circuits enable the impedance of the signal line 101 to grow larger and larger in the extending direction of the signal line 101, resulting in different charging rates when the signal line 101 charges the pixel driving circuits located in different positions. When the duration of the data write stage of the pixel driving circuit is shorter, the charging rates are different when the signal line 101 charges pixel driving circuits located in different positions so that the signal line 101 supplies different signal voltages to the pixel driving circuit located in the different positions, resulting in different drive current generated by the pixel driving circuits located in the different positions and thus resulting in poor display uniformity of the display panel. Exemplarily, when the signal line 101 is a data line, in the extending direction of the signal line 101, the charging rates of the multiple pixel driving circuits become smaller and smaller so that the data voltages written into the multiple pixel driving circuits become smaller and smaller, resulting in brighter luminance of the display panel and poor display uniformity of the display panel.

Figure 2:
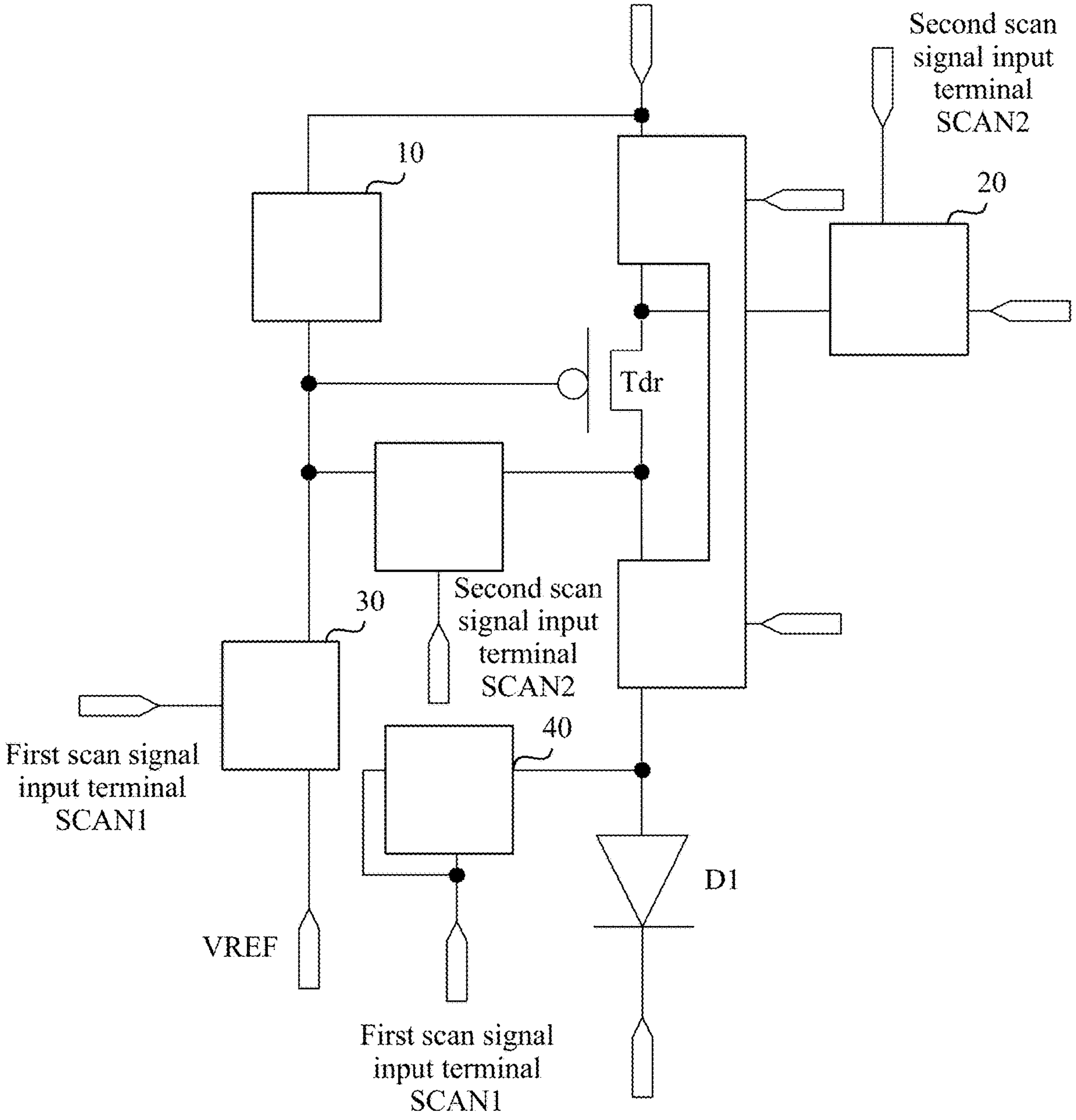
FIG. 2 is a diagram illustrating the structure of a pixel driving circuit according to embodiments of the present application.

Embodiments of the present application provide a pixel driving circuit. As shown in FIG. 2, the pixel driving circuit includes a drive transistor Tdr, a storage module 10, a data writing module 20, a first initialization module 30, a second initialization module 40 and a light-emitting element D1. The first initialization module 30; is connected to the drive transistor Tdr and configured to initialize the gate of the drive transistor Tdr. The control terminal of the second initialization module 40 and the first terminal of the second initialization module 40 are connected to the scan signal input terminal of the pixel driving circuit. The second initialization module 40 is configured to initialize the light-emitting element D1. The data writing module 20 is configured to write a data voltage into the gate of the drive transistor Tdr. The storage module 10 is configured to store a gate voltage of the drive transistor Tdr. The drive transistor Tdr is configured to output a drive current according to the data voltage to drive the light-emitting element D1 to emit light.

The first terminal of the first initialization module 30 may be connected to the initialization signal input terminal VREF of the pixel driving circuit, and the second terminal of the first initialization module 30 may be connected to the gate of the drive transistor Tdr. The first initialization module 30 is controlled to turn on, and an initialization signal supplied by the initialization signal input terminal VREF is transmitted to the gate of the drive transistor Tdr. Then, the gate of the drive transistor Tdr can be initialized. The control terminal of the second initialization module 40 and the first terminal of the second initialization module 40 are connected to the scan signal input terminal of the pixel driving circuit. The second terminal of the second initialization module 40 is connected to the anode of the light-emitting element D1. The second initialization module 40 is controlled to turn on, and a scan signal supplied by the scan signal input terminal is transmitted to the anode of the light-emitting element D1 through the second initialization module 40. Then, the anode of the light-emitting element D1 can be initialized. After the gate of the drive transistor Tdr and the anode of the light-emitting element D1 are initialized, the data writing module 20 writes a data voltage into the gate of the drive transistor Tdr, the storage module 10 stores a gate voltage of the drive transistor Tdr, and then the drive transistor Tdr forms a drive current according to the gate voltage to drive the light-emitting element D1 to emit light.

In the initialization process of the gate of the drive transistor Tdr and the anode of the light-emitting element D1, the gate of the drive transistor Tdr is initialized by use of the initialization signal supplied by the initialization signal input terminal VREF, and the potential of the gate of the drive transistor Tdr is the initialization signal. In the data write stage of the pixel driving circuit, the time required to write a data voltage into the gate of the drive transistor Tdr is related to the initialization signal and the charging rate. The higher the potential of the initialization signal is, the greater the charging rate is and the shorter the required time is. When the working duration of one frame of the pixel driving circuit is shorter, the data write time of the pixel driving circuit is shorter; at this time, the potential of the initialization signal may be made higher so that the data voltage can be written into the gate of the drive transistor Tdr in a short time so that insufficient data voltage writes caused by a too low potential of the gate of the drive transistor can be avoided at the end of initialization. Additionally, different drive currents caused by different charging rates of different pixel driving circuits can be avoided, and thereby the display uniformity of a display panel provided with the pixel driving circuit can be improved. Moreover, the configuration in which the anode of the light-emitting element D1 is configured to be initialized by use of a scan signal supplied by the second initialization module 40 through the scan signal input terminal saves the trouble of providing another initialization signal input terminal, thereby saving the trouble of providing an additional initialization signal line, reducing the wiring difficulty of the display panel and helping the display panel to achieve a higher refresh rate or a higher PPI.

With continued reference to FIG. 2, the pixel driving circuit includes a first scan signal input terminal SCAN1 and a second scan signal input terminal SCAN2. The first scan signal input terminal SCAN1 is connected to the control terminal of the first initialization module 30. The second scan signal input terminal SCAN2 is connected to the control terminal of the data writing module 20. The control terminal of the second initialization module 40 and the first terminal of the second initialization module 40 are connected to the first scan signal input terminal SCAN1 or the second scan signal input terminal SCAN2.

FIG. 2 illustrates that the control terminal of the second initialization module 40 and the first terminal of the second initialization module 40 are connected to the first scan signal input terminal SCAN1. In the initialization stage of the pixel driving circuit, a first scan signal supplied by the first scan signal input terminal SCAN1 controls the first initialization module 30 and the second initialization module 40 to turn on, and an initialization signal supplied by the initialization signal input terminal VREF is transmitted to the gate of the drive transistor Tdr through the first initialization module 30. Then, the gate of the drive transistor Tdr is initialized. Meanwhile, the second initialization module 40 transmits the first scan signal to the anode of the light-emitting element D1 to initialize the anode of the light-emitting element D1. The potential of the initialized gate of the drive transistor Tdr is the potential of the initialization signal, and the potential of the initialized anode of the light-emitting element D1 is the potential of the first scan signal; therefore, the potential of the initialization signal may be higher so that in the data write stage of the pixel driving circuit, a data voltage can be written into the gate of the drive transistor Tdr in a short time, and the display uniformity of the display panel can be improved. Meanwhile, the potential of the first scan signal may be at a low level to satisfy the initialization requirement of the anode of the light-emitting element D1.

Figure 3:
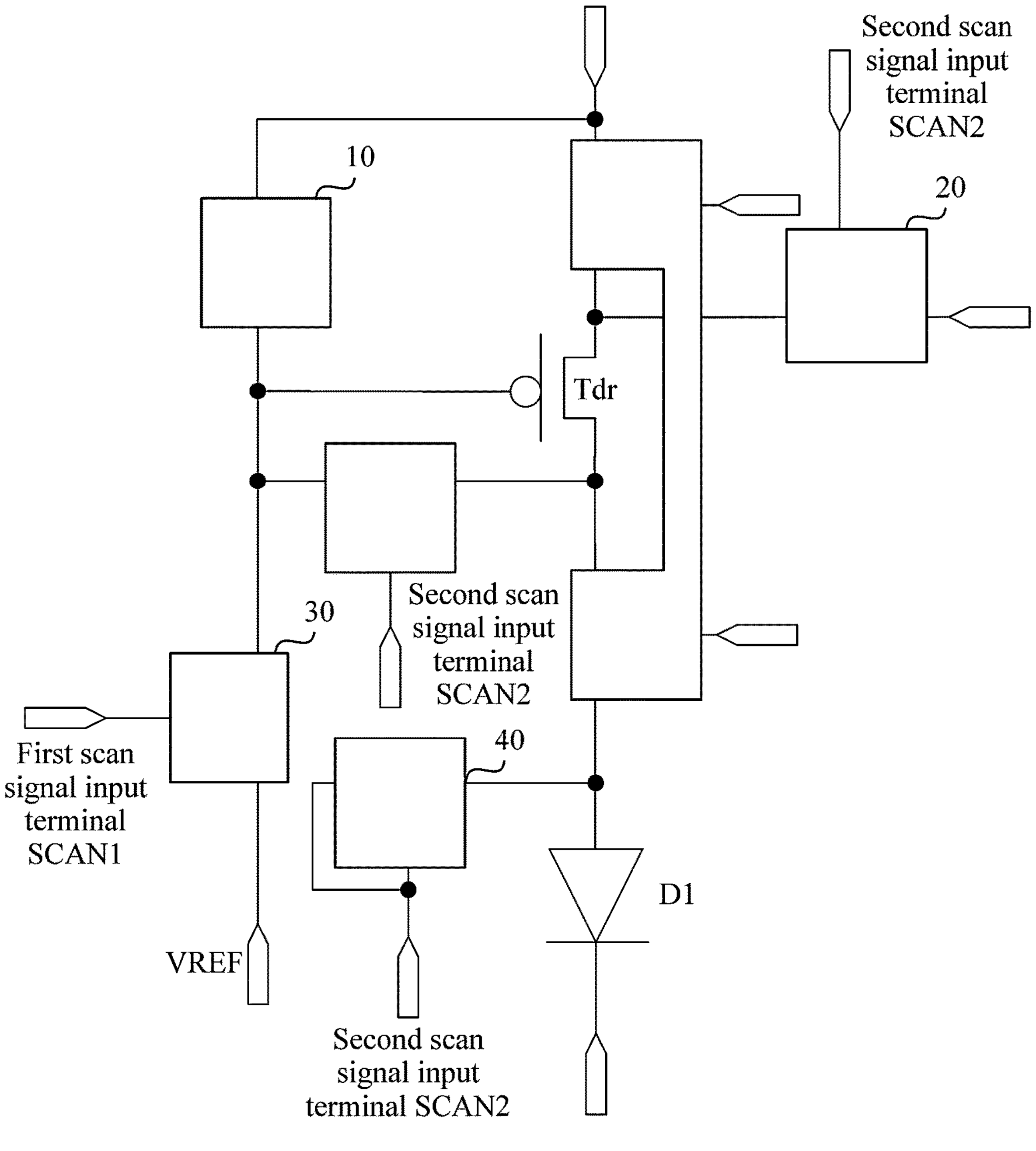
FIG. 3 is a diagram illustrating the structure of another pixel driving circuit according to embodiments of the present application.

As shown in FIG. 3, the control terminal of the second initialization module 40 and the first terminal of the second initialization module 40 may also be connected to the second scan signal input terminal SCAN2. In the initialization stage of the pixel driving circuit, a first scan signal supplied by the first scan signal input terminal SCAN1 controls the first initialization module 30 to turn on, and an initialization signal supplied by the initialization signal input terminal VREF is transmitted to the gate of the drive transistor Tdr through the first initialization module 30. Then, the gate of the drive transistor Tdr is initialized. In the data write stage, a second scan signal supplied by the second scan signal input terminal SCAN2 controls the second initialization module 40 to turn on and is transmitted to the anode of the light-emitting element D1 through the second initialization module 40. Then, the anode of the light-emitting element D1 is initialized.

Figure 4:
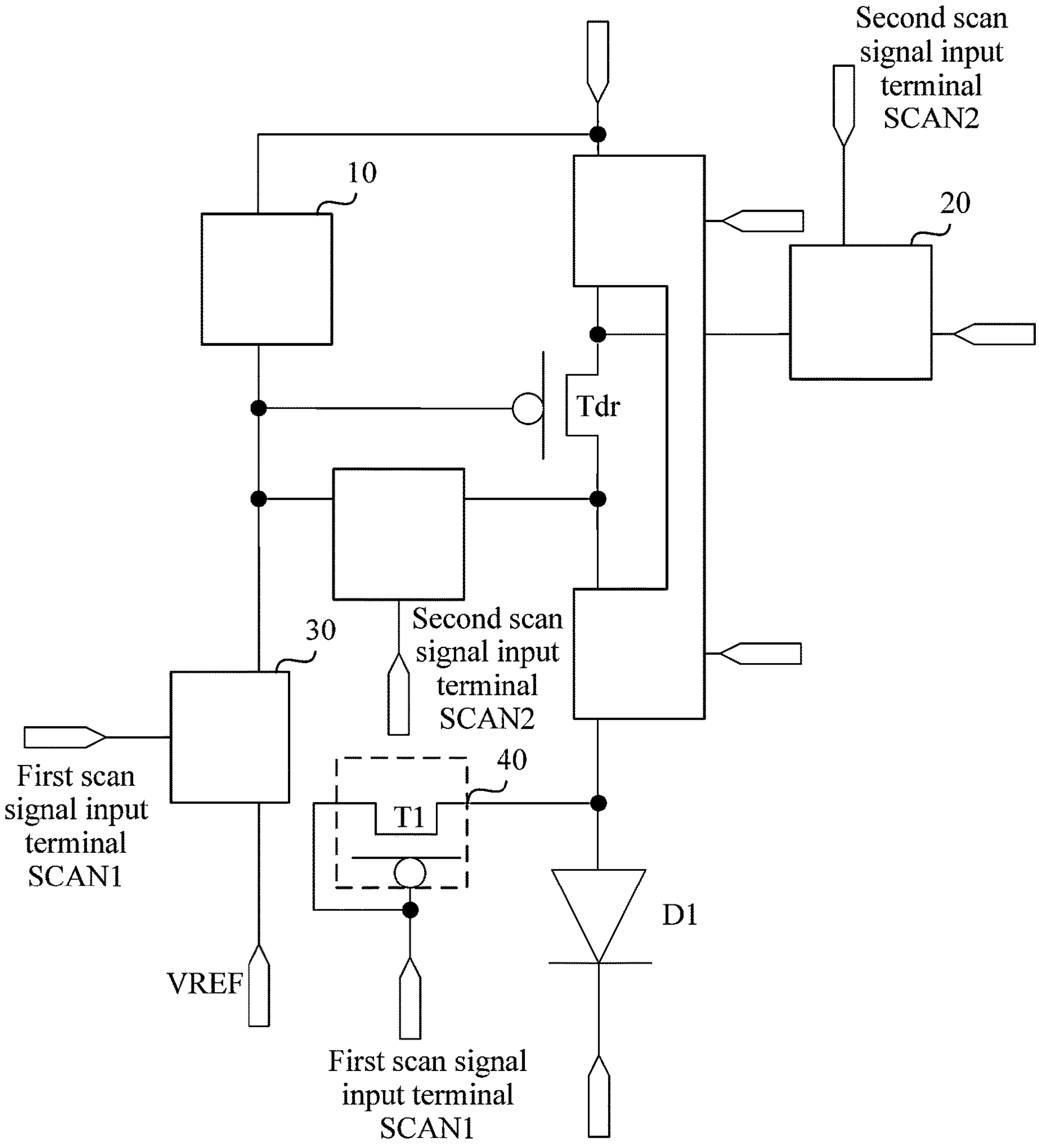
FIG. 4 is a diagram illustrating the structure of another pixel driving circuit according to embodiments of the present application.

As shown in FIG. 4, the second initialization module 40 includes a first transistor T1. The gate of the first transistor T1 serves as the control terminal of the second initialization module 40. The first electrode of the first transistor T1 serves as the first terminal of the second initialization module 40. The second electrode of the first transistor T1 serves as the second terminal of the second initialization module 40 and is connected to the anode of the light-emitting element D1.

FIG. 4 illustrates that the first transistor T1 is a P-type transistor, and the gate of the first transistor T1 and the first electrode of the first transistor T1 are connected to the first scan signal input terminal SCAN1. In the initialization stage of the pixel driving circuit, the first scan signal is at a low level, and the first transistor T1 is controlled to turn on, and the first scan signal is transmitted to the anode of the light-emitting element D1 through the first transistor T1. Then, the anode of the light-emitting element D1 is initialized. Moreover, when the first scan signal is at a low level, the potential of the first scan signal is less than 0, which can satisfy the initialization requirement of the anode of the light-emitting element D1.

In other embodiments, the gate of the first transistor T1 and the first electrode of the first transistor T1 may also be connected to the second scan signal input terminal SCAN2. In the initialization stage of the pixel driving circuit, a first scan signal supplied by the first scan signal input terminal SCAN1 controls the first initialization module 30 to turn on. Then, the gate of the drive transistor Tdr is initialized. In the data write stage, a second scan signal supplied by the second scan signal input terminal SCAN2 is at a low level, and the first transistor T1 is controlled to turn on, and the second scan signal is transmitted to the anode of the light-emitting element D1 through the first transistor T1. Then, the anode of the light-emitting element D1 is initialized. Similarly, when the second scan signal is at a low level, the potential of the second scan signal is less than 0, which can satisfy the initialization requirement of the anode of the light-emitting element D1.

Figure 5:
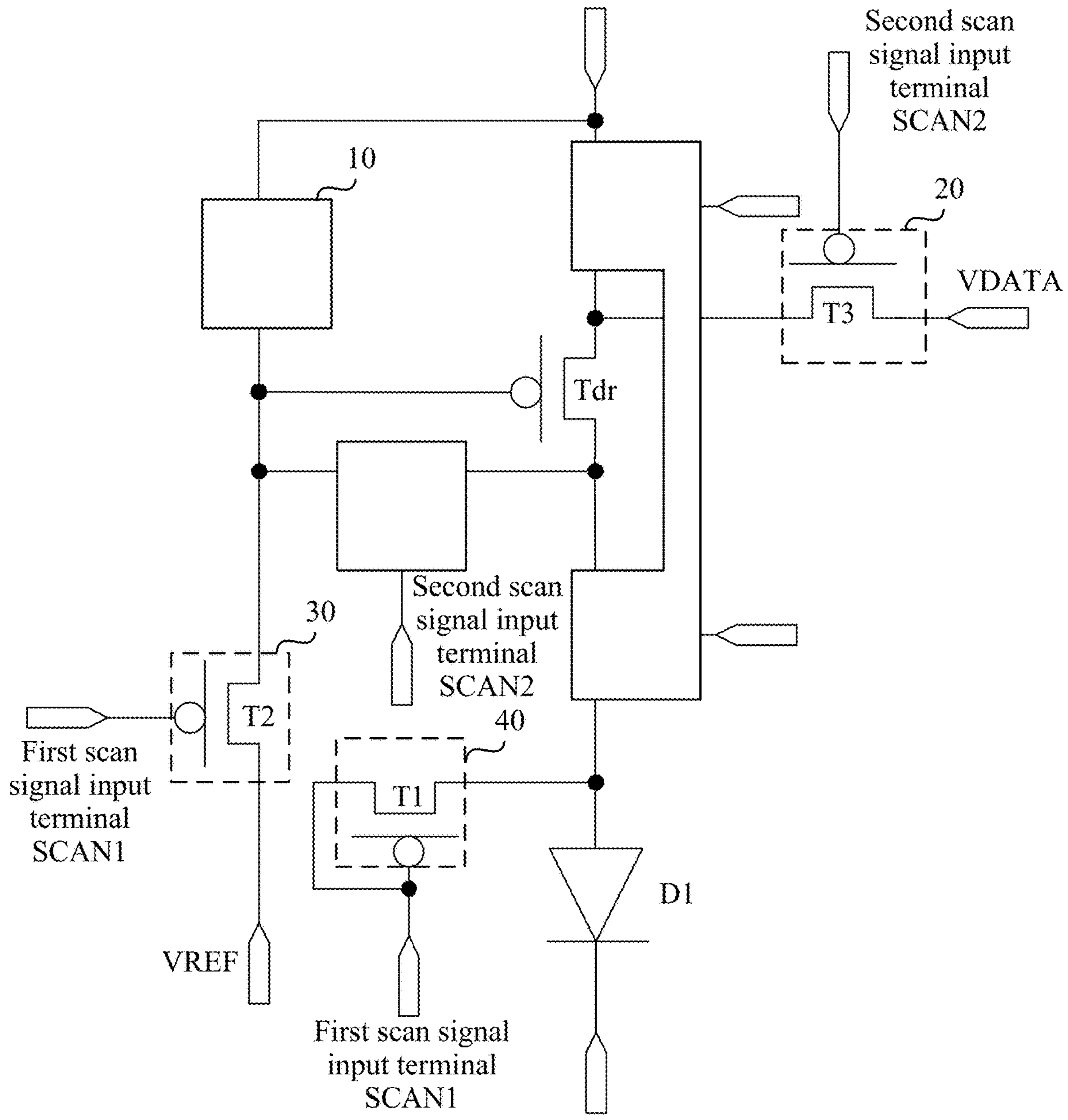
FIG. 5 is a diagram illustrating the structure of another pixel driving circuit according to embodiments of the present application.

As shown in FIG. 5, the pixel driving circuit further includes an initialization signal input terminal VREF and a data signal input terminal VDATA; the first initialization module 30 includes a second transistor T2; and the data writing module 20 includes a third transistor T3. The gate of the second transistor T2 is connected to the first scan signal input terminal SCAN1, the first electrode of the second transistor T2 is connected to the initialization signal input terminal VREF, and the second electrode of the second transistor T2 is connected to the gate of the drive transistor Tdr. The gate of the third transistor T3 is connected to the second scan signal input terminal SCAN2, the first electrode of the third transistor T3 is connected to the data signal input terminal VDATA, and the second electrode of the third transistor T3 is connected to the first electrode of the drive transistor Tdr.

FIG. 5 illustrates that the each of second transistor T2 and the third transistor T3 is a P-type transistor. In the initialization stage of the pixel driving circuit, the first scan signal is at a low level, and the second transistor T2 is turned on, and an initialization signal supplied by the initialization signal input terminal VREF is transmitted to the gate of the drive transistor Tdr through the second transistor T2. Then, the gate of the drive transistor Tdr is initialized. In the data write stage of the pixel driving circuit, the second scan signal is at a low level, and the third transistor T3 is turned on, and a data signal supplied by the data signal input terminal VDATA is transmitted to the gate of the drive transistor Tdr through the third transistor T3 to write data. Then, the drive transistor Tdr forms a drive current according to a gate voltage to drive the light-emitting element D1 to emit light.

Figure 6:
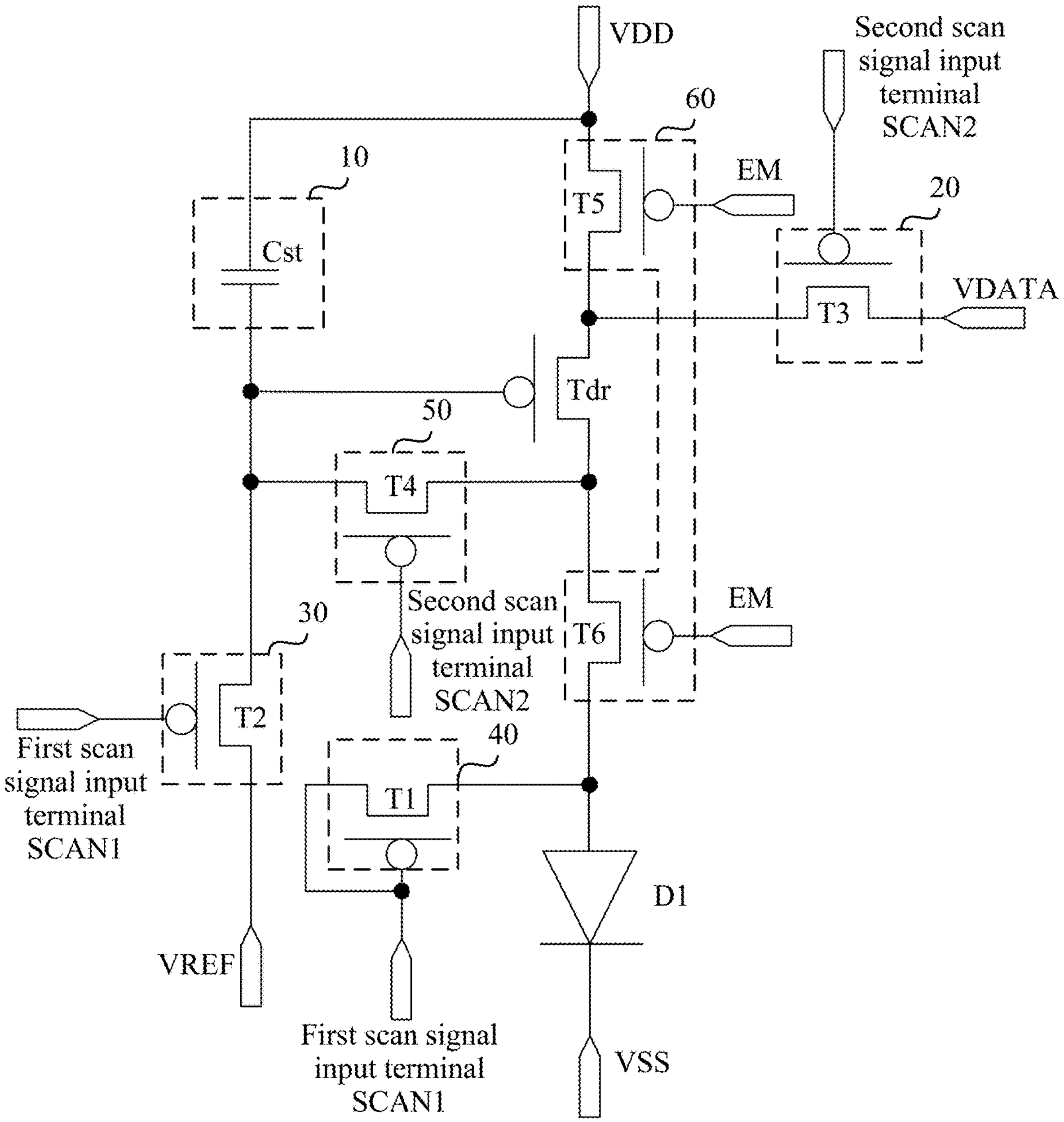
FIG. 6 is a diagram illustrating the structure of another pixel driving circuit according to embodiments of the present application.

As shown in FIG. 6, the pixel driving circuit further includes a threshold compensation module 50, a light emission control module 60, a light emission control signal input terminal EM, a first power signal input terminal VDD and a second power signal input terminal VSS; and the storage module 10 includes a storage capacitor Cst. The control terminal of the threshold compensation module 50 is connected to the second scan signal input terminal SCAN2, the first terminal of the threshold compensation module 50 is connected to the gate of the drive transistor Tdr and the first electrode of the storage capacitor Cst, and the second terminal of the threshold compensation module 50 is connected to the second electrode of the drive transistor Tdr. The control terminal of the light emission control module 60 is connected to the light emission control signal input terminal EM, the first terminal of the light emission control module 60 and the second electrode of the storage capacitor Cst are connected to the first power signal input terminal VDD, the second terminal of the light emission control module 60 is connected to the first electrode of the drive transistor Tdr, the third terminal of the light emission control module 60 is connected to the second electrode of the drive transistor Tdr, and the fourth terminal of the light emission control module 60 is connected to the anode of the light-emitting element D1. The cathode of the light-emitting element D1 is connected to the second power signal input terminal VSS.

The control terminal of the threshold compensation module 50 is connected to the second scan signal input terminal SCAN2. The threshold compensation module 50 is configured to compensate for the threshold voltage of the drive transistor Tdr in the data write stage of the pixel driving circuit. The control terminal of the light emission control module 60 is connected to the light emission control signal input terminal EM. The light emission control module 60 is configured to control the storage capacitor Cst to couple a data voltage to the drive transistor Tdr in the light emission stage of the pixel driving circuit so that the drive transistor Tdr can form a drive current according to the data signal to drive the light-emitting element D1 to emit light.

With continued reference to FIG. 6, the threshold compensation module 50 includes a fourth transistor T4. The gate of the fourth transistor T4 serves as the control terminal of the threshold compensation module 50, the first electrode of the fourth transistor T4 serves as the first terminal of the threshold compensation module 50, and the second electrode of the fourth transistor T4 serves as the second terminal of the threshold compensation module 50.

FIG. 6 illustrates that the fourth transistor T4 is a P-type transistor. The gate of the fourth transistor T4 is connected to the second scan signal input terminal SCAN2, the first electrode of the fourth transistor T4 is connected to the gate of the drive transistor Tdr, and the second electrode of the fourth transistor T4 is connected to the second electrode of the drive transistor Tdr. In the data write stage of the pixel driving circuit, the second scan signal supplied by the second scan signal input terminal SCAN2 is at a low level, the third transistor T3 and the fourth transistor T4 are turned on, a data signal is written into the gate of the drive transistor Tdr through the third transistor T3, and the drive transistor Tdr and the fourth transistor T4 until the potential of the gate of the drive transistor Tdr reaches the sum of the threshold voltage of the drive transistor Tdr and the data voltage, and the drive transistor Tdr is cut off. In this manner, the data signal is written, and the threshold voltage of the drive transistor Tdr is compensated for.

With continued reference to FIG. 6, the light emission control module 60 includes a fifth transistor T5 and a sixth transistor T6. The first electrode of the fifth transistor T5 serves as the first terminal of the light emission control module 60, the second electrode of the fifth transistor T5 serves as the second terminal of the light emission control module 60, the first electrode of the sixth transistor T6 serves as the third terminal of the light emission control module 60, the second electrode of the sixth transistor T6 serves as the fourth terminal of the light emission control module 60, and the gate of the fifth transistor T5 and the gate of the sixth transistor T6 serve as the control terminal of the light emission control module 60.

FIG. 6 illustrates that each of the fifth transistor T5 and the sixth transistor T6 is a P-type transistor. In the light emission stage of the pixel driving circuit, a light emission control signal supplied by the light emission control signal input terminal EM is at a low level, the fifth transistor T5 and the sixth transistor T6 are controlled to turn on, a first power signal supplied by the first power signal input terminal VDD is transmitted to the first electrode of the drive transistor Tdr, and the potential of the gate of the drive transistor Tdr is the sum of the threshold voltage of the drive transistor Tdr and the data signal. In this light emission stage, the drive transistor Tdr forms a drive current according to the threshold voltage of the drive transistor Tdr, the first power signal and the data signal, and then the drive current is transmitted to the light-emitting element D1 through the sixth transistor T6 to drive the light-emitting element D1 to emit light.

Figure 7:
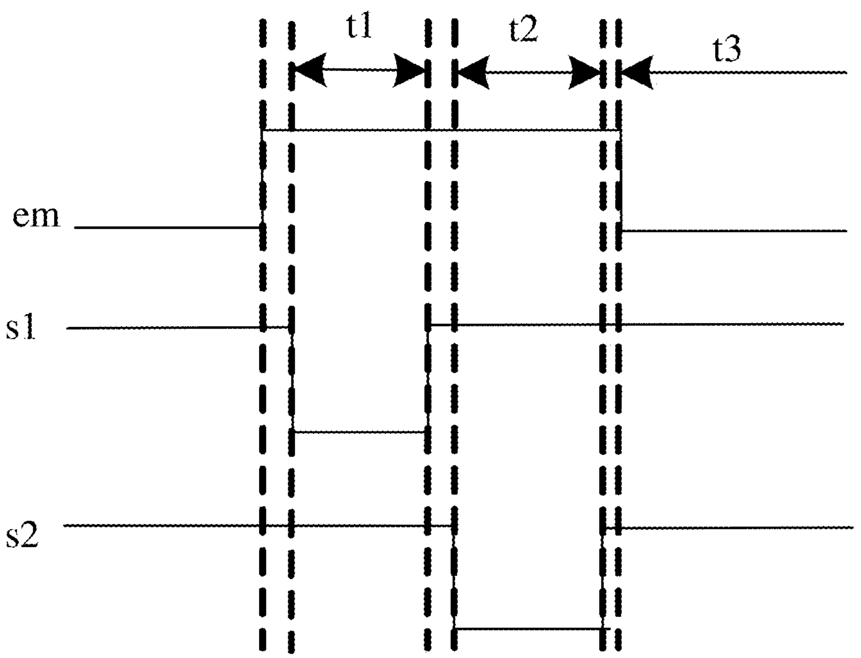
FIG. 7 is a timing diagram corresponding to the pixel driving circuit of FIG. 6.

Referring to FIG. 7, s1 is a timing diagram of a first scan signal supplied by the first scan signal input terminal SCAN1, s2 is a timing diagram of a second scan signal supplied by the second scan signal input terminal SCAN2, and em is a timing diagram of a light emission control signal supplied by the light emission control signal input terminal EM.

The working process of the pixel driving circuit is expressed below in conjunction with FIG. 6 and FIG. 7.

In the initialization stage t1, the first scan signal s1 is at a low level, the second scan signal s2 is at a high level, the light emission control signal em is at a high level, and the first transistor T1 and the second transistor T2 are turned on. In the initialization stage t1, the first scan signal is transmitted to the anode of the light-emitting element D1 through the first transistor T1, and the anode of the light-emitting element D1 is initialized; and the initialization signal supplied by the initialization signal input terminal VREF is transmitted to the gate of the drive transistor Tdr through the second transistor T2, and the gate of the drive transistor Tdr is initialized. The drive transistor Tdr is turned on after the end of the initialization stage t1.

In the data write stage t2, the first scan signal s1 is at a high level, the second scan signal s2 is at a low level, the light emission control signal em is at a high level, and the third transistor T3 and the fourth transistor T4 are turned on. In the data write stage t2, a data signal supplied by the data signal input terminal VDATA is written into the gate of the drive transistor Tdr through the third transistor T3, the drive transistor Tdr and the fourth transistor T4 until the potential of the gate of the drive transistor Tdr reaches the sum of the threshold voltage vth of the drive transistor Tdr and the data voltage vdata', that is, vdata'+vth, and the drive transistor Tdr is cut off. In this manner, the data signal vdata is written, the threshold voltage of the drive transistor Tdr is compensated for, and the potential of the gate of the drive transistor Tdr and the potential of the first electrode of the drive transistor Tdr remain unchanged by the storage capacitor Cst.

In the light emission stage t3, the first scan signal s1 is at a high level, the second scan signal s2 is at a high level, the light emission control signal em is at a low level, and the fifth transistor T5 and the sixth transistor T6 are turned on. In the light emission stage t3, the first power signal vdd supplied by the first power signal input terminal VDD is transmitted to the first electrode of the drive transistor Tdr through the fifth transistor T5 so that the first electrode of the drive transistor Tdr hops from the data signal vdata to the first power signal vdd, thus driving the drive transistor Tdr to turn on. In the light emission stage t3, the drive transistor Tdr forms a drive current according to the potential of the gate and the voltage of the first electrode, and then the drive current is transmitted to the anode of the light-emitting element D1 through the sixth transistor T6 to drive the light-emitting element D1 to emit light. The drive current is expressed below:

$$I = \frac{1}{2}\mu Cox\frac{w}{L}(vgs - vth)^2 = \frac{1}{2}\mu Cox\frac{w}{L}(vdata' + vth - vdd' - vth)^2 = \frac{1}{2}\mu Cox\frac{w}{L}(vdata' - vdd')^2$$

In this formula, μ denotes the carrier mobility of the drive transistor Tdr, Cox denotes the capacitor constant of the drive transistor Tdr, w denotes the channel width of the drive transistor Tdr, L denotes the channel length of the drive transistor Tdr, vgs denotes the voltage difference between the gate of the drive transistor Tdr and the first electrode of the drive transistor Tdr, vth denotes the threshold voltage of the drive transistor Tdr, vdd' denotes the voltage of the first power signal, and vdata' denotes the data voltage.

As seen from the drive current formula, the drive current is independent of the threshold voltage of the drive transistor Tdr so that the threshold voltage of the drive transistor Tdr is compensated for.

FIG. 6 illustrates that the gate of the first transistor T1 is connected to the first scan signal input terminal SCAN1. In other embodiments, the gate of the first transistor T1 may also be connected to the second scan signal input terminal SCAN2; in this case, the first transistor T1 is turned on in the data write stage to initialize the anode of the light-emitting element D1.

With continued reference to FIG. 6, the drive transistor Tdr is a P-type transistor, the sum of the first power signal vdd supplied by the first power signal input terminal VDD and the threshold voltage vth of the drive transistor Tdr is the first voltage, and the voltage of the initialization signal supplied by the initialization signal input terminal VREF is greater than 0 and less than the first voltage.

When the drive transistor Tdr is a P-type transistor, the threshold voltage vth of the drive transistor Tdr is negative. When the gate-source voltage difference of the drive transistor Tdr (that is the difference between the potential of the gate of the drive transistor Tdr and the potential of the first electrode of the drive transistor Tdr) is less than the threshold voltage with of the drive transistor Tdr, the drive transistor Tdr is turned on.

In the initialization stage of the pixel driving circuit, the potential of the gate of the drive transistor Tdr is the initialization signal vref supplied by the initialization signal input terminal VREF. In the data write stage of the pixel driving circuit, the third transistor T3 and the fourth transistor T4 are turned on, and the potential of the first electrode of the drive transistor Tdr is the potential of the data signal vdata. In the data write stage of the pixel driving circuit, since the potential of the data signal vdata is related to the display grayscale of the pixel driving circuit, when the display grayscale of the pixel driving circuit is black, the potential of the data signal vdata reaches the maximum value and may be the first voltage. In the data write stage, the initialization signal vref is less than the first voltage so that the difference between the potential of the gate of the drive transistor Tdr and the potential of the first electrode of the drive transistor Tdr can be ensured to be less than the threshold voltage of the drive transistor Tdr so that the drive transistor Tdr can be ensured to be turned on. In this manner, data is written, and the threshold voltage of the drive transistor Tdr is compensated for.

The potential of the initialization signal vref is greater than 0 so that the potential of the gate of the initialized drive transistor Tdr can be ensured to be higher. In this manner, the time required to write the gate of the drive transistor Tdr to the first voltage is shorter in the data write stage so that insufficient data voltage writes caused by a too low potential of the gate of the drive transistor can be avoided at the end of initialization. Additionally, different drive currents caused by different charging rates of different pixel driving circuits can be avoided, and thereby the display uniformity of a display panel provided with the pixel driving circuit can be improved.

Figure 8:
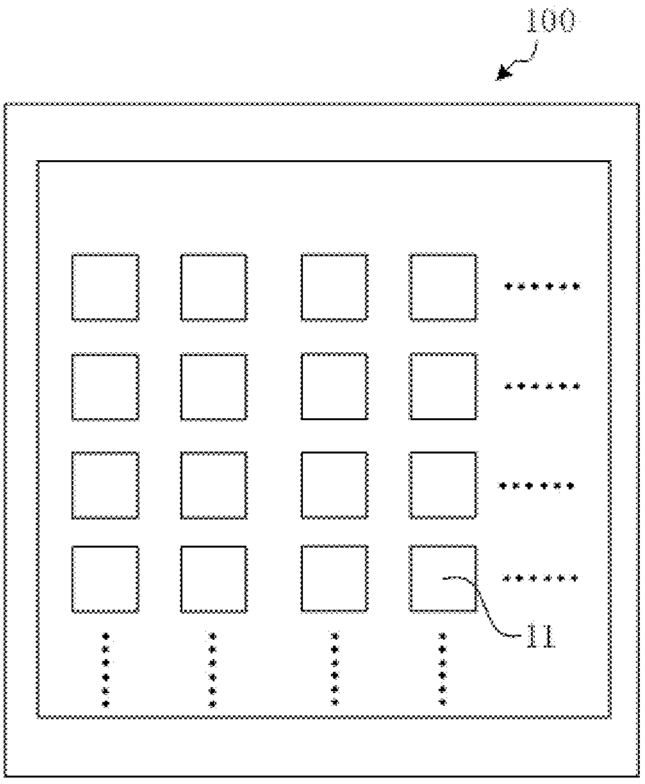
FIG. 8 is a diagram illustrating the structure of a display panel according to embodiments of the present application.

As shown in FIG. 8, embodiments of the present application further provide a display panel including the pixel driving circuit according to any embodiment of the present application.

As shown in FIG. 8, the display panel 100 includes multiple pixel driving circuits 11. Each pixel driving circuit 11 drives a light-emitting element to emit light in the working process. In this manner, displaying is performed on the display panel 100.

Figure 9:
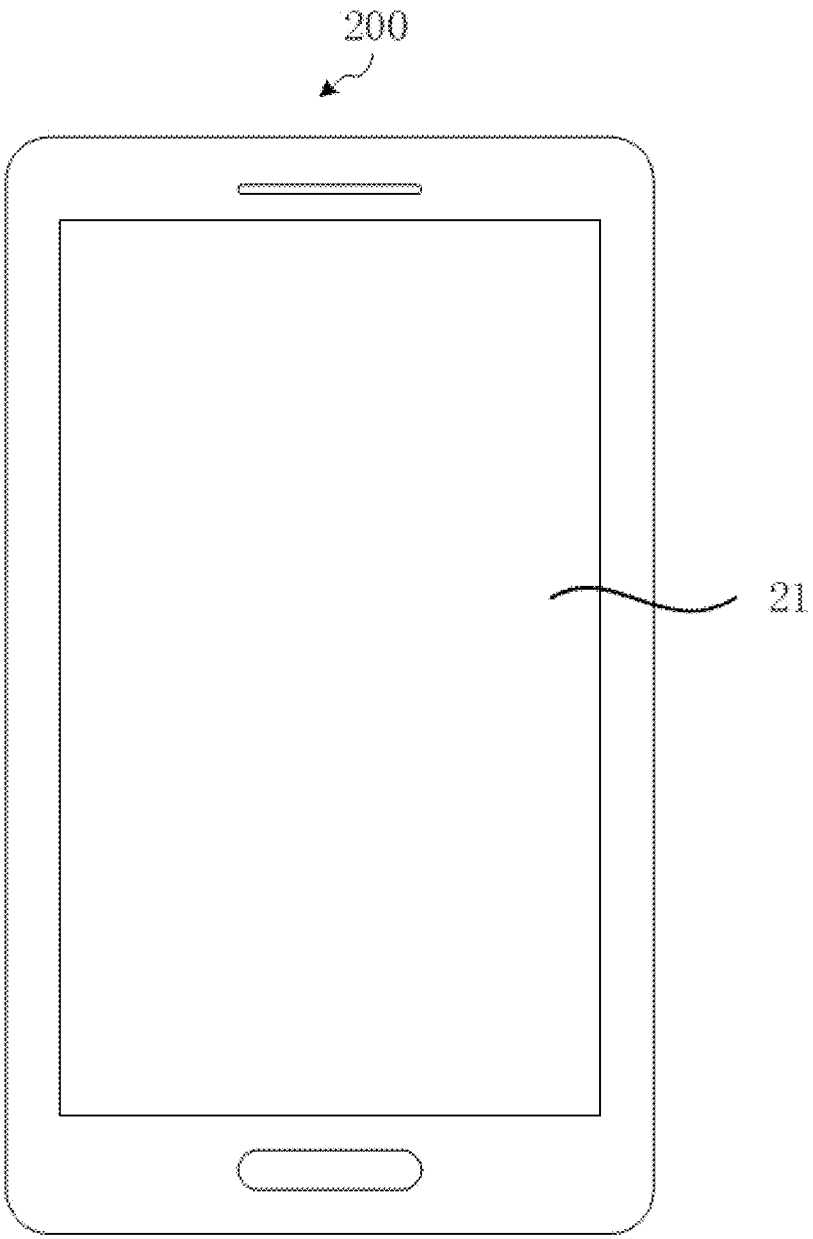
FIG. 9 is a diagram illustrating the structure of a display device according to embodiments of the present application.

As shown in FIG. 9, embodiments of the present application further provide a display device 200 including the display panel 21 according to any embodiment of the present application.

What is claimed is:

1. A display panel, comprising:

a driver chip disposed at a first end of the display panel;

a signal line extending from the driver chip to a second end of the display panel opposite the first end of the display panel, the signal line supplying a data signal from the driver chip to a plurality of pixel driving circuits;

each of the plurality of pixel driving circuits, further comprising:

a drive transistor;

a first initialization module, wherein the first initialization module is connected to the drive transistor and configured to initialize a gate of the drive transistor;

a light-emitting element;

a second initialization module, wherein a control terminal of the second initialization module and a first terminal of the second initialization module are connected to a scan signal input terminal, a second terminal of the second initialization module is connected to the light-emitting element, and the second initialization module is configured to initialize the light-emitting element;

a data writing module, wherein the data writing module is connected to the drive transistor and configured to write a data voltage into the gate of the drive transistor; and a storage module, wherein the storage module is connected to the drive transistor and configured to store a gate voltage of the drive transistor, wherein the drive transistor is connected to the light-emitting element and configured to output a drive current according to the data voltage to drive the light-emitting element to emit light;

during a data write stage of the pixel driving circuit the potential of the data signal is related to a display grayscale of the pixel driving circuit;

the potential of the data signal reaches the maximum value when the display grayscale of the pixel driving circuit is black; and a first voltage is equal to the potential of the data signal when the display grayscale of the pixel driving circuit is black;

wherein each of the plurality of pixel driving circuits is configured to drive a light-emitting element in the each of the plurality of pixel driving circuits to emit light such that the charging rate and brightness of each of the plurality of pixel driving circuits is uniform;

wherein the first initialization module is configured to avoid insufficient data voltage writes at the end of the initialization of the gate of the drive transistor by varying the initialization according to the duration of a data write stage.

2. The display panel according to claim 1, wherein each of the plurality of pixel driving circuits comprises a first scan signal input terminal and a second scan signal input terminal, wherein the first scan signal input terminal is connected to a control terminal of the first initialization module, and the second scan signal input terminal is connected to a control terminal of the data writing module; and the control terminal of the second initialization module and the first terminal of the second initialization module are connected to the first scan signal input terminal or the second scan signal input terminal.

3. The display panel according to claim 2, wherein for each of the plurality of pixel circuits a first terminal of the first initialization module is connected to an initialization signal input terminal, and a second terminal of the first initialization module is connected to the gate of the drive transistor.

4. The display panel according to claim 1, wherein for each of the plurality of pixel driving circuits the second initialization module comprises a first transistor, and wherein a gate of the first transistor serves as the control terminal of the second initialization module, a first electrode of the first transistor serves as the first terminal of the second initialization module, and a second electrode of the first transistor is connected to an anode of the light-emitting element.

5. The display panel according to claim 4, wherein each of the plurality of pixel driving circuit comprises a first scan signal input terminal and a second scan signal input terminal, the first initialization module comprises a second transistor, and the data writing module comprises a third transistor, wherein a gate of the second transistor is connected to the first scan signal input terminal, a first electrode of the second transistor is connected to an initialization signal input terminal, and a second electrode of the second transistor is connected to the gate of the drive transistor;

a gate of the third transistor is connected to the second scan signal input terminal, a first electrode of the third transistor is connected to a data signal input terminal, and a second electrode of the third transistor is connected to a first electrode of the drive transistor; and a write stage voltage of an initialization signal supplied by the initialization signal input terminal is less than the first voltage.

6. The display panel according to claim 5, each of the plurality of pixel driving circuits further comprising a threshold compensation module and a light emission control module, wherein the storage module comprises a storage capacitor, wherein a control terminal of the threshold compensation module is connected to the second scan signal input terminal, a first terminal of the threshold compensation module is connected to the gate of the drive transistor and a first electrode of the storage capacitor, and a second terminal of the threshold compensation module is connected to a second electrode of the drive transistor; and a control terminal of the light emission control module is connected to a light emission control signal input terminal, a first terminal of the light emission control module and a second electrode of the storage capacitor are connected to a first power signal input terminal, a second terminal of the light emission control module is connected to the first electrode of the drive transistor, a third terminal of the light emission control module is connected to the second electrode of the drive transistor, a fourth terminal of the light emission control module is connected to the anode of the light-emitting element, and a cathode of the light-emitting element is connected to a second power signal input terminal.

7. The display panel according to claim 6, wherein for each of the plurality of pixel circuits the threshold compensation module comprises a fourth transistor, wherein a gate of the fourth transistor serves as the control terminal of the threshold compensation module, a first electrode of the fourth transistor serves as the first terminal of the threshold compensation module, and a second electrode of the fourth transistor serves as the second terminal of the threshold compensation module.

8. The display panel according to claim 7, wherein for each of the plurality of pixel circuits the light emission control module comprises a fifth transistor and a sixth transistor, wherein a first electrode of the fifth transistor serves as the first terminal of the light emission control module, a second electrode of the fifth transistor serves as the second terminal of the light emission control module, a first electrode of the sixth transistor serves as the third terminal of the light emission control module, a second electrode of the sixth transistor serves as the fourth terminal of the light emission control module, and a gate of the fifth transistor and a gate of the sixth transistor serve as the control terminal of the light emission control module.

9. The display panel according to claim 8, wherein for each of the plurality of pixel circuits each of the fifth transistor and the sixth transistor is a P-type transistor.

10. The display panel according to claim 7, wherein for each of the plurality of pixel circuits the fourth transistor is a P-type transistor.

11. The display panel according to claim 6, wherein for each of the plurality of pixel circuits the drive transistor is a P-type transistor, a sum of a first power signal supplied by the first power signal input terminal and a threshold voltage of the drive transistor is a second voltage, and a voltage of an initialization signal supplied by the initialization signal input terminal is greater than 0 (zero) and less than the second voltage.

12. The display panel according to claim 5, wherein for each of the plurality of pixel circuits each of the second transistor and the third transistor is a P-type transistor.

13. The display panel according to claim 4, wherein for each of the plurality of pixel circuits the first transistor is a P-type transistor.

14. A display device, comprising the display panel according to claim 1.

15. The display panel according to claim 1, the signal line further comprising a data line and a power signal line.

* * * * *